April 29, 1947.  R. D. ACTON  2,419,522
SNOW VEHICLE
Filed Nov. 25, 1944  2 Sheets-Sheet 1
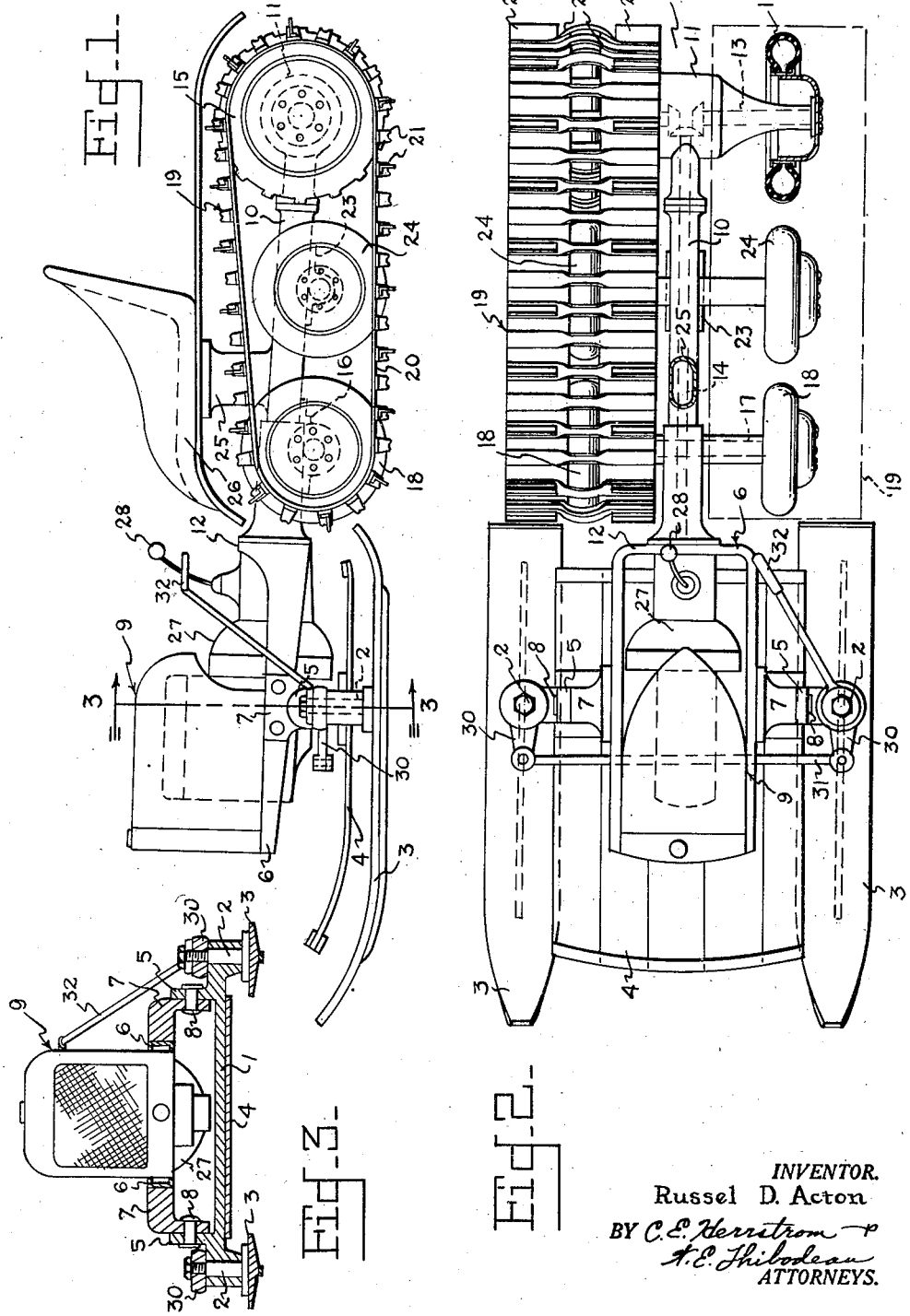
INVENTOR.
Russel D. Acton
BY C. E. Herrstrom
H. E. Thibodeau
ATTORNEYS.

April 29, 1947. R. D. ACTON 2,419,522
SNOW VEHICLE
Filed Nov. 25, 1944 2 Sheets-Sheet 2
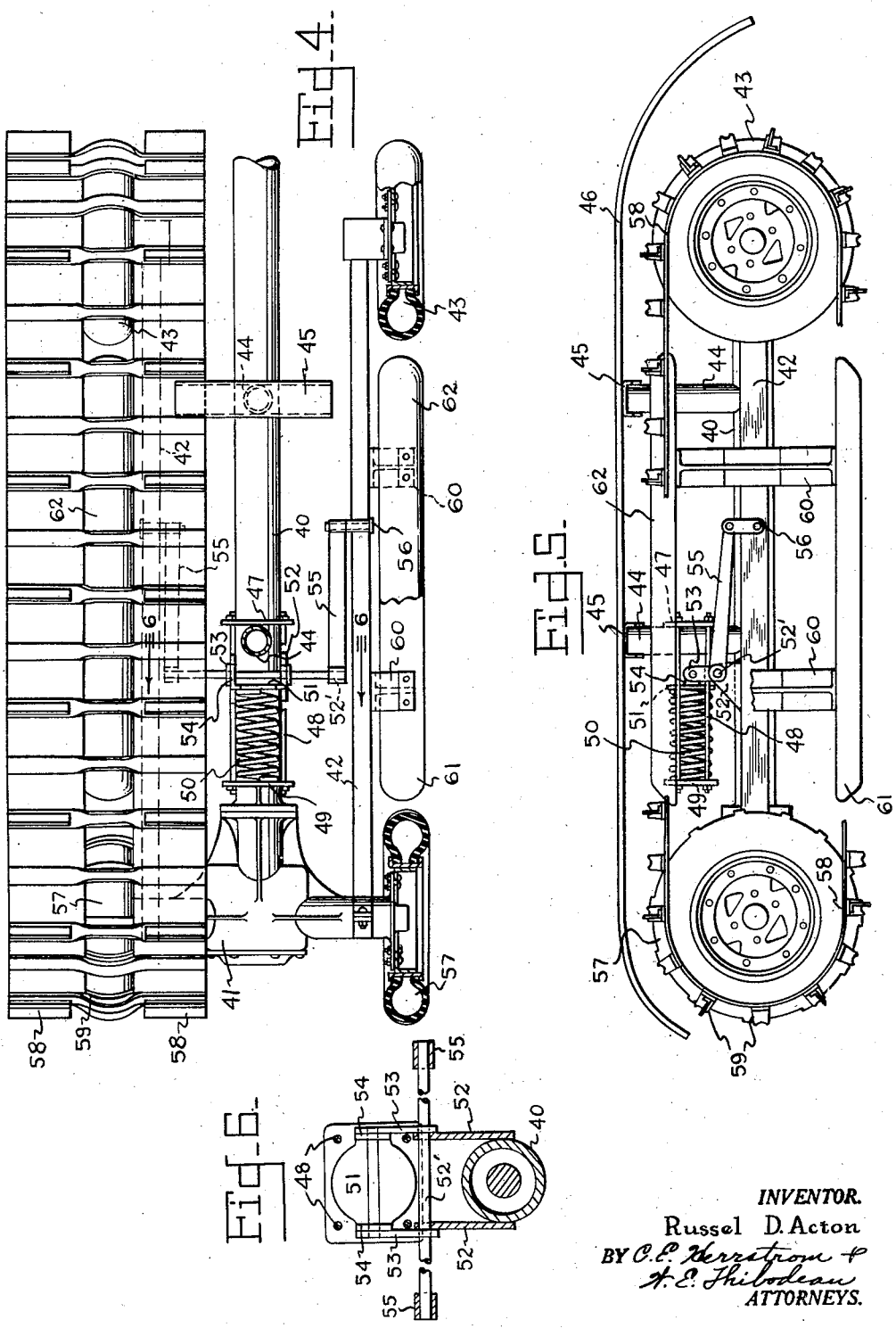
INVENTOR.
Russel D. Acton
ATTORNEYS.

Patented Apr. 29, 1947

2,419,522

UNITED STATES PATENT OFFICE 2,419,522

SNOW VEHICLE

Russel D. Acton, Danville, Ill.

Application November 25, 1944, Serial No. 565,171

10 Claims. (Cl. 180—5)

(Granted under the act of March 3, 1883, as amended April 30, 1928; 370 O. G. 757)

The invention described herein may be manufactured and used by or for the Government for governmental purposes, without the payment to me of any royalty thereon.

The present invention pertains to a novel snow vehicle designed primarily for use as a tractor or for breaking a trail in snow.

The wheeled or track-laying vehicles hitherto used for this purpose form, in deep and soft snow, a track consisting of a pair of grooves spaced a substantial distance apart and thereby leaving an intermediate ridge of considerable width. Such a ridge is obviously objectionable to sleds or vehicles following the trail, especially in the case of vehicles, where the ridge interferes with the under structure of the vehicle. Another principal objection to the usual track-laying vehicle for operation on snow is that the space between the tracks in deep snow results in packing the snow under the vehicle with the result that it soon becomes stalled with the tracks spinning and with the vehicle supported on the packed snow therebeneath. Another feature which has defeated successful use of snow vehicles is that sufficient flexibility has not been provided in closely spaced tracks to assure even weight distribution over uneven surfaces and to prevent crushing the supporting surfaces in localized areas.

An important object of this invention is to substantially eliminate the space between the tracks of a track-laying vehicle and to thereby eliminate the difficulty heretofore encountered with the hanging-up of a vehicle on snow packing therebeneath.

Another principal object is to utilize extremely flexible tracks spaced closely together so that they may readily conform to and substantially cover concave or convex surfaces whereby the vehicle may follow any ground contour without undue concentration of weight at localized areas with consequent breaking-through of the snow surface, said breaking-through causing subsequent failure of the entire supporting surface.

Another important object of this invention is to reduce materially the width of the ridge of snow left between the tracks. This object is accomplished by the use of relatively wide tracks on the vehicle, so disposed that they are spaced apart only a minimum distance at the longitudinal center of the vehicle. This arrangement is made possible by a unique design of vehicle frame consisting, in addition to the motor-supported assembly, of a single central longitudinal member carrying the propeller shaft. The latter is geared to a transverse shaft, also supported by the longitudinal frame member, for driving the tracks. The idlers for the track are supported in like manner.

Another object of the invention is to enable the use of forward runners without danger of their sinking too deep into the snow. This object is realized by the use of a toboggan supported between the runners and slightly elevated from the plane of the runners. The weight of the motor and transmission is thus adequately supported on the snow. The runners are pivotally supported, and a suitable mechanism is provided for turning them on their axis for steering.

The invention is fully disclosed in an illustrative embodiment in the following description and the accompanying drawing in which:

Figure 1 is a side elevation of the device;

Figure 2 is a plan view of the device with the seat removed and other parts broken away;

Figure 3 is a section on the line 3—3 of Figure 1, the radiator appearing in elevation;

Figure 4 is a plan view of a modification partly broken away;

Figure 5 is a side elevation thereof, and

Figure 6 is a section on the line 6—6 of Figure 4.

A transverse forward frame member 1 carries a pair of pivot bolts 2, and the lower ends of these bolts in turn have steering runners 3 fixed thereto. The body of the member 1 may carry at its lower surface a toboggan 4 slightly elevated from the runners 3 for a purpose that will presently be described.

The member 1 has a pair of upstanding ears 5 near its ends between which is inserted and pivotally mounted a three-sided motor supporting frame 6 by means of brackets 7 secured to the sides of the frame and attached to the ears 5 by pivot pins 8. A gasoline motor 9 of suitable design is secured between the sides of the frame 6, preferably by being inserted through the forward open end of the latter, as shown.

The remainder of the vehicle frame consists primarily of a central and longitudinal shaft housing 10 terminating in a gear housing 11 at the rear. The forward end of the shaft housing is preferably secured to the back 12 of the motor frame 6.

A rear drive shaft 13 is suitably journaled in the housing 11 and driven from a shaft 14 within the housing 10, through suitable gearing indicated diagrammatically by dotted lines in Figure 2 within the housing 11. The ends of the shaft 13 carry suitably driving wheels 15 or sprockets which drive a pair of tracks, as will presently be shown.

Near its forward end, the longitudinal shaft housing 10 carries a suspended bearing 16 in which is journaled a shaft 17 carrying at its end a pair of idlers 18.

Over each rear driver 15 and its alined idler 18 is trained an endless track 19 of suitable construction, for example, spaced bands 20 connected by flights 21. Each track, as shown in Figure 2, extends inward as far as permitted by the housing 10, thereby leaving a comparatively narrow space 22 between the tracks. The housing 10 carries a desired number of additional suspended bearings 23 in each of which is supported a pair of idlers or bogie wheels 24 engaging the lower lap of each track.

Upon the forward end of the housing 10 is mounted and secured a foot 25 carrying a seat 26 of sufficient width to accommodate two or three persons. Since the vehicle is intended for use primarily as a tractor or a trail breaker, the cargo space is relatively unimportant. However, a receptacle or additional seats may be carried on the member 10 by means of additional members similar to the foot 25.

To the rear of the motor 9 is a transmission housing 27 from which extends a gear shift lever 28 within the reach of the driver. The latter may rest his feet on the brackets 7.

A forwardly extending arm 30 is secured to the upper end of each of the pivot pins 2, and the arms are joined by a tie rod 31. A steering lever or tiller 32 is secured to one of the pivot pins and extended to a point within convenient reach of the driver. It is evident that this lever may be used to turn both runners 3 in either lateral direction for steering.

The use of the comparatively wide tracks, which is made possible by the peculiar shape of the frame, results in a comparatively narrow and unobjectionable central ridge in the trail. A wider ridge left by a vehicle having tires or narrower tracks is obviously an impediment to vehicles or sleds subsequently following the trail. The elevated toboggan 4 prevents the runners 3 and the motor from sinking too deep into the snow.

In the modification shown in Figures 4, 5 and 6, the frame structure consists, as formerly, of a central longitudinal shaft housing 40 with a transverse drive shaft housing 41 at its rear end. The front end structure has been omitted inasmuch as it is similar to that shown in Figures 1, 2 and 3. At each end of the housing 41 is pivotally mounted an elongated bar 42 extending lengthwise of the vehicle and carrying one of the forward wheels 43.

Upon the housing 40, at suitable intervals, are secured vertical posts 44 carrying transverse bars 45 for supporting a floor 46 or other superstructure. Against the forward side of the post 44 forward of the housing 41 is laid a plate 47 in which are mounted the ends of a number of rods 48 carrying a similar plate 49 at their remaining ends and thereby forming a cage. A coil spring 50 is mounted in the cage between the plate 49 and an inserted floating plate 51.

Directly below the plate 51, a pair of brackets 52 are secured to opposite sides of the housing 40, and support a rotatable transverse shaft 52'. The shaft 52' carries a pair of levers 53 pivotally attached to fingers 54 extending from the plate 51. Each end of the shaft 52' has rigidly secured thereto a lever 55 extending forwardly and having its forward end attached to the adjacent bar 42 through a link 56.

The rear housing 41 supports suitable driving wheels 57 as described in connection with Figures 1 and 2. The track consists of a pair of spaced bands 58 connected by flights 59, with the wheels 43 and 57 received in the spaces between the bands.

Each of the longitudinal bars 42 has secured thereto a pair of spaced uprights 60 to the lower ends of which is attached a runner 61 and to the upper ends of which is attached a similar member 62. Both members 61 and 62 are received in the spaces between the bands 58 and thus prevent sagging of the track in the horizontal laps.

The spring 50 exerts a downward pressure on the bars 42 through the leverage systems 52—56. The forward wheels 43 are thus sprung independently of the rear wheels. Similarly, a downward pressure is exerted on the runners 61 to hold the lower lap of the track in a firm condition, although resiliently, between the front and rear wheels.

Specific embodiments of the invention has been illustrated and described, but various modifications in the details of construction may be made without departing from the scope of the invention as indicated by the appended claims.

What I claim is:

1. In a vehicle adapted to traverse soft snow, a forward motor-supporting assembly, a narrow elongated frame member extending rearwardly from said assembly and disposed substantially centrally of the gage of the vehicle, a propeller shaft journaled in said member, a transverse shaft rotatably supported by said member and geared to said propeller shaft, wheels carried by both ends of said transverse shaft, another pair of wheels supported from said frame member in alinement with the first named wheels, and a wide flexible endless track trained over the wheels at each side of said frame member being supported at its central portion by said wheels, said tracks being narrowly spaced and extending into close proximity to said narrow frame member whereby the narrow column of snow left between said tracks is insufficient in width to have any substantial supporting effect on the frame of the vehicle.

2. In a vehicle adapted to traverse soft snow, a forward motor-supporting assembly, a narrow elongated frame member extending rearwardly from said assembly and disposed substantially centrally of the gage of the vehicle, a propeller shaft journaled in said member, a transverse shaft rotatably supported by said member and geared to said propeller shaft, wheels carried by both ends of said transverse shaft, another pair of wheels supported from said frame member in alinement with the first named wheels, and a wide flexible endless track trained over the wheels at each side of said frame member being supported at its central portion by said wheels, said tracks being narrowly spaced and extending into close proximity to said frame member, and spaced apart a distance equal to a minor fraction of the overall width of both tracks.

3. In a vehicle adapted to traverse soft snow, a forward motor-supporting assembly, a narrow elongated frame member extending rearwardly from said assembly and disposed substantially centrally of the gage of the vehicle, a propeller shaft journaled in said member, a transverse shaft rotatably supported by said member and geared to said propeller shaft, wheels carried by both ends of said transverse shaft, another pair of wheels supported from said frame member in alinement with the first named wheels, and a wide flexible endless track trained over the wheels at each side of said frame member being supported at its central portion by said wheels, said tracks being narrowly spaced and extending into close proximity to said narrow frame member whereby the narrow column of snow left between said tracks is insufficient in width to have any substantial supporting effect on the frame of the vehicle, and a narrow load support mounted upon said frame member and extending vertically upwardly between said narrowly spaced tracks.

4. In a vehicle adapted to traverse soft snow, a forward motor-supporting assembly, an elongated narrow frame member extending rearwardly from said assembly and disposed substantially centrally of the gage of the vehicle, a propeller shaft journaled in said member, a transverse shaft rotatably supported by said member and geared to said propeller shaft, wheels carried by both ends of said transverse shaft, another pair of wheels supported from said frame member in alinement with the first named wheels, and a wide flexible endless track trained over the wheels at each side of said frame member being supported at its central portion by said wheels, said tracks being narrowly spaced and extending into close proximity to said frame member whereby the narrow column of snow left between said tracks is insufficient in width to have any substantial supporting effect on the frame of the vehicle, a pair of spaced runners pivotally carried by said assembly and means for steering said runners.

5. In a vehicle adapted to traverse soft snow, a forward motor-supporting assembly, an elongated narrow frame member extending rearwardly from said assembly and disposed substantially centrally of the gage of the vehicle, a propeller shaft journaled in said member, a transverse shaft rotatably supported by said member and geared to said propeller shaft, wheels carried by both ends of said transverse shaft, another pair of wheels supported from said frame member in alinement with the first named wheels, and a wide flexible endless track trained over the wheels at each side of said frame member being supported at its central portion by said wheels, said tracks being narrowly spaced and extending into close proximity to said frame member whereby the narrow column of snow left between said tracks is insufficient in width to have any substantial supporting effect on the frame of the vehicle, a pair of spaced runners pivotally carried by said assembly, a toboggan carried by said assembly and elevated from said runners, and means for steering said runners.

6. In a vehicle, a forward motor-supporting assembly, an elongated narrow tubular frame member extending rearwardly from said assembly and disposed substantially centrally of the gage of the vehicle, a propeller shaft journaled in said member, a transverse shaft rotatably supported by said member and geared to said propeller shaft, wheels carried by both ends of said transverse shaft, another pair of wheels supported from said frame member in alinement with the first named wheels, and a wide flexible endless track trained over the wheels at each side of said frame member being narrowly spaced and extending into close proximity to said frame member.

7. In a vehicle, a forward motor supporting assembly, a narrow elongated frame member extending rearwardly from said assembly centrally thereof, a propeller shaft journaled on said member, a transverse shaft rotatably supported by said member and geared to said propeller shaft, narrow spaced rotatable track-carrying elements carried at the ends of said transverse shaft, additional rotatable elements supported from said frame member in longitudinal alignment with said first-named elements and wide endless closely-spaced tracks carried by said rotatable elements at each side of the frame member, said tracks including spaced flexible belts mounted at each side of the rotatable elements and metal grouser elements connecting said belts, said track assemblies being flexible for substantial tilting about a longitudinal axis whereby the vehicle may traverse convex and concave surfaces having relatively short radii with said tracks being adapted to conform to said surfaces with very even distribution of the vehicle weight on the surfaces which the tracks contact.

8. In a vehicle, a forward motor supporting assembly, a narrow elongated frame member extending rearwardly from said assembly centrally thereof, a propeller shaft journaled on said member, a transverse shaft rotatably supported by said member and geared to said propeller shaft, narrow spaced rotatable track-carrying elements carried at the ends of said transverse shaft, additional rotatable elements supported from said frame member in longitudinal alignment with said first-named elements, wide endless closely-spaced tracks carried by said rotatable elements at each side of the frame member, the adjacent portions operating closely adjacent the narrow frame, said tracks including spaced flexible belts mounted at each side of the rotatable elements and metal grouser elements connecting said belts, said track assemblies being flexible for substantial tilting about a longitudinal axis whereby the vehicle may traverse convex and concave surfaces having relatively short radii with the tracks being adapted to conform to said surfaces.

9. In a vehicle, a forward motor supporting assembly, a narrow elongated frame member extending rearwardly from said assembly centrally thereof, a propeller shaft journaled on said member, a transverse shaft rotatably supported by said member and geared to said propeller shaft, narrow spaced rotatable track-carrying elements carried at the ends of said transverse shaft, additional rotatable elements supported from said frame member in longitudinal alignment with said first-named elements, wide endless closely-spaced tracks carried by said rotatable elements at each side of the frame member, the adjacent portions operating closely adjacent the narrow frame, said tracks including spaced flexible belts mounted at each side of the rotatable elements and metal grouser elements connecting said belts, said track assemblies being flexible for substantial tilting about a longitudinal axis whereby the vehicle may traverse convex and concave surfaces having relatively short radii with the tracks being adapted to conform to said surfaces, vertical uprights as narrow as said frame extending upwardly between the closely-spaced tracks, and a load-supporting structure supported solely on said supports and extending laterally over said tracks.

10. In a vehicle, a forward motor supporting assembly, a power plant thereon, a narrow elongated frame member extending rearwardly from said assembly centrally thereof, a propeller shaft journaled on said member, a transverse shaft rotatably supported by said member and geared to said propeller shaft, narrow spaced rotatable track-carrying elements carried at the ends of said transverse shaft; additional rotatable elements supported from said frame member in longitudinal alignment with said first-named elements, wide endless closely-spaced tracks carried by said rotatable elements at each side of the frame member, the adjacent portions operating closely adjacent the narrow frame, said tracks including spaced flexible belts mounted at each side of the rotatable elements and metal grouser elements connecting said belts, said track assemblies being flexible for substantial tilting about a longitudinal axis whereby the vehicle may traverse convex and concave surfaces having relatively short radii with the tracks being adapted to conform to said surfaces, vertical uprights as narrow as said frame extending upwardly between the closely-spaced tracks, a load-supporting structure supported solely on said supports and extending laterally over said tracks, and an operator's seat on the forward end of said structure with its seating surface closely spaced to the upper runs of the tracks, said power plant being of a width to provide space at the sides thereof forwardly of the tracks for the operator's legs.

RUSSEL D. ACTON.

REFERENCES CITED

The following references are of record in the file of this patent:

UNITED STATES PATENTS

| Number | Name | Date |
| --- | --- | --- |
| 1,273,777 | Hansen | July 23, 1918 |
| 1,425,835 | Bufe | Aug. 15, 1922 |
| 2,339,886 | Shannon | Jan. 25, 1944 |
| 1,850,691 | Roberts | Mar. 22, 1932 |
| 2,284,075 | Tucker et al. | May 26, 1942 |
| 2,312,071 | Broadwater | Feb. 23, 1943 |